(12) United States Patent
Ko et al.

(10) Patent No.: US 11,165,163 B2
(45) Date of Patent: Nov. 2, 2021

(54) GLASS STRUCTURE INCLUDING LENS AND RECEIVER INCLUDING LENS

(71) Applicant: Samsung Electronics Co., Ltd., Suwon-si (KR)

(72) Inventors: Seungtae Ko, Suwon-si (KR); Byungchul Kim, Seongnam-si (KR); Yoongeon Kim, Suwon-si (KR); Youngju Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 67 days.

(21) Appl. No.: 16/606,394

(22) PCT Filed: May 14, 2018

(86) PCT No.: PCT/KR2018/005487
§ 371 (c)(1),
(2) Date: Oct. 18, 2019

(87) PCT Pub. No.: WO2018/212524
PCT Pub. Date: Nov. 22, 2018

(65) Prior Publication Data
US 2021/0111495 A1 Apr. 15, 2021

(30) Foreign Application Priority Data
May 18, 2017 (KR) .................. 10-2017-0061884

(51) Int. Cl.
*H01Q 1/22* (2006.01)
*H01Q 1/32* (2006.01)
(Continued)

(52) U.S. Cl.
CPC ....... *H01Q 15/02* (2013.01); *B32B 17/10036* (2013.01); *B32B 17/10761* (2013.01);
(Continued)

(58) Field of Classification Search
CPC .......... H01Q 1/12; H01Q 1/1221; H01Q 1/22; H01Q 1/32; H01Q 1/325; H04B 1/3827;
(Continued)

(56) References Cited

U.S. PATENT DOCUMENTS 6,014,110 A    1/2000  Bridges
2001/0013842 A1  8/2001  Ishikawa et al.
(Continued)

FOREIGN PATENT DOCUMENTS

CN    1188995 A    7/1998
CN    102751583 A   10/2012
(Continued)

OTHER PUBLICATIONS

Extended European Search Report dated Feb. 18, 2020, issued in European Application No. 18802253.7.
(Continued)

*Primary Examiner* — Blane J Jackson
(74) *Attorney, Agent, or Firm* — Jefferson IP Law, LLP

(57) ABSTRACT

The present disclosure relates to: a communication technique for converging an IoT technology with a 5G communication system for supporting a higher data transmission rate beyond a 4G system; and a system therefor. Specifically, the present invention provides a glass structure comprising: a glass formed to be permeable to radio waves; and a lens disposed on one side of the glass so as to change the incident angle of radio waves incident to the one side of the glass.

12 Claims, 15 Drawing Sheets

(51) Int. Cl.
  *H01Q 15/02* (2006.01)
  *B32B 17/10* (2006.01)
  *H04B 1/06* (2006.01)

(52) U.S. Cl.
  CPC .............. *H01Q 1/325* (2013.01); *H04B 1/06* (2013.01); *B32B 2551/00* (2013.01); *B32B 2605/10* (2013.01)

(58) Field of Classification Search
  CPC .......... H04B 1/06; H04B 1/38; H04B 1/3822; B32B 17/00; B32B 17/10761; B32B 17/10036
  See application file for complete search history.

(56) References Cited

U.S. PATENT DOCUMENTS

| | | | |
|---|---|---|---|
| 2002/0101390 A1* | 8/2002 | Takeuchi | H01Q 19/065 343/910 |
| 2003/0011888 A1 | 1/2003 | Cox et al. | |
| 2004/0189933 A1 | 9/2004 | Sun et al. | |
| 2010/0207833 A1 | 8/2010 | Toso et al. | |
| 2014/0139910 A1 | 5/2014 | Gafsi et al. | |
| 2015/0093466 A1 | 4/2015 | Estinto et al. | |
| 2016/0093944 A1 | 3/2016 | Kamo | |
| 2016/0255310 A1 | 9/2016 | Min'Kovskiy et al. | |
| 2017/0324144 A1* | 11/2017 | Talty | H01Q 13/28 |
| 2018/0090825 A1* | 3/2018 | Jiang | H01Q 1/42 |
| 2018/0309196 A1 | 10/2018 | Mayer et al. | |
| 2021/0050881 A1* | 2/2021 | Ng | H01Q 13/24 |

FOREIGN PATENT DOCUMENTS

| | | |
|---|---|---|
| CN | 204936956 U | 1/2016 |
| CN | 105873872 A | 8/2016 |
| JP | H07-099407 A | 4/1995 |
| JP | 2005-353990 A | 12/2005 |
| JP | 2015-535098 A | 12/2015 |
| JP | 2016-70916 A | 5/2016 |
| JP | 2016-534975 A | 11/2016 |
| KR | 10-0446033 B1 | 11/2004 |
| WO | 2017/064054 A1 | 4/2017 |

OTHER PUBLICATIONS

Paul Oliver et al: "Gradient index metamaterial based on slot elements", Applied Physics Letters, A I P Publishing LLC, US, vol. 96, No. 24, (Jun. 16, 2010), pp. 241110-241110, XP012131571, Jun. 16, 2010.

Mao Xiaole et al: "Tunable Liquid Gradient Refractive Index (L-GRIN) lens with two degrees of freedom", Lab on a Chip, vol. 9, No. 14, (Jan. 1, 2009), p. 2050, XP055789751, Jan. 1, 2009.

Chinese Office Action dated Apr. 27, 2021, issued in Chinese Application No. 201880029485.3.

European Office Action dated dated dated Mar. 31, 2021, issued in European Application No. 18802253.7.

Korean Office Action dated Aug. 17, 2021, issued in Korean Application No. 10-2017-0061884.

\* cited by examiner

XY-PLANE DIRECTION

XZ-PLANE DIRECTION

XY-PLANE DIRECTION       XZ-PLANE DIRECTION

GLASS STRUCTURE INCLUDING LENS AND RECEIVER INCLUDING LENS

TECHNICAL FIELD

The disclosure relates to a device capable of improving a gain value of a receiver through a lens, and particularly, to a device capable of receiving radio waves, while minimizing a loss of gain value, from a base station that radiates radio waves at a fixed angle.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

In the super-high frequency band used by the 5G communication system, a gain value of a receiver may change rapidly depending on an incidence angle of a received radio wave. Thus, for smooth 5G communication, it is necessary to properly adjust the incidence angle of the radio wave at the receiver.

Particularly, in case of an express train, the location of a base station is limited in a tunnel for the train, and the location of a receiver is also limited to a position that can avoid the deterioration of radio waves due to metal. Thus, the incidence angle of the radio wave radiated from the base station to the receiver is fixed.

Accordingly, the disclosure proposes a method of improving the gain value of the receiver by adjusting the fixed angle of incidence through a lens.

Solution to Problem

According to an embodiment of the disclosure, a glass structure may include a glass formed to transmit a radio wave, and a lens disposed on one side of the glass and changing an incidence angle of the radio wave incident on the one side of the glass.

The glass structure may further include a dielectric slab disposed between the glass and the lens and compensating for a transmission loss caused when the radio wave incident through the lens transmit s through the glass.

Permittivity of the dielectric slab may be determined based on permittivity and thickness of the glass.

When an incidence angle of the radio wave incident on the lens exceeds a predetermined reference value, the lens may change a phase value of the radio wave so that the incidence angle of the radio wave incident on the glass becomes smaller than the predetermined reference value.

According to an embodiment of the disclosure, a train receiving a radio wave radiated from a base station at a predetermined radiation angle may include a lens disposed on an outer surface of a window of the train and changing an incidence angle of the radio wave incident from the base station.

The train may further include a dielectric slab disposed between the window and the lens and compensating for a transmission loss caused when the radio wave incident through the lens transmits through the window.

The window may have a structure in which a first layer formed of glass, a second layer formed of a protective film, and a third layer formed of glass are stacked in a direction from an inside of the train to an outside of the train, and permittivity of the dielectric slab may be determined based on permittivity of each of the glass and the protective film.

The lens may change a phase value of the radio wave radiated from the base station and thereby reduces an incidence angle of the radio wave incident on the window.

The train may further include a receiver disposed on an inner surface of the window of the train and receiving the radio wave from the base station, and the lens may reduce an incidence angle of the radio wave incident on the window to transmit the radio wave to the receiver.

According to an embodiment of the disclosure, a train may include a receiver receiving a radio wave radiated from at least one base station at a predetermined radiation angle. The receiver may include an antenna array capable of transmitting and receiving the radio wave, and a lens disposed to be spaced apart from the antenna array at a predetermined interval. The lens may change an incidence angle of the radio wave incident from the at least one base station.

The receiver may be disposed on a roof of the train, and the lens may change an incidence angle of the radio wave radiated from the at least one base station to transmit the radio wave to the antenna array.

The receiver may be disposed on a front window of the train, and the lens may change an incidence angle of the radio wave radiated from the at least one base station to transmit the radio wave to the antenna array.

Advantageous Effects of Invention

According to an embodiment of the disclosure, even if the base station transmits a radio wave at a fixed angle, an incidence angle of the radio wave is adjustable at the receiver by the lens. It is therefore possible to prevent the loss of the gain value of the receiver.

In addition, communication between the base station and the receiver is allowed through the window of the train. This can prevent the radio wave from being scattered by metal, thereby improving the gain value of the receiver.

Also, applying the lens to the base station can expand the coverage of the base station.

MODE FOR THE INVENTION

Figure 1A:
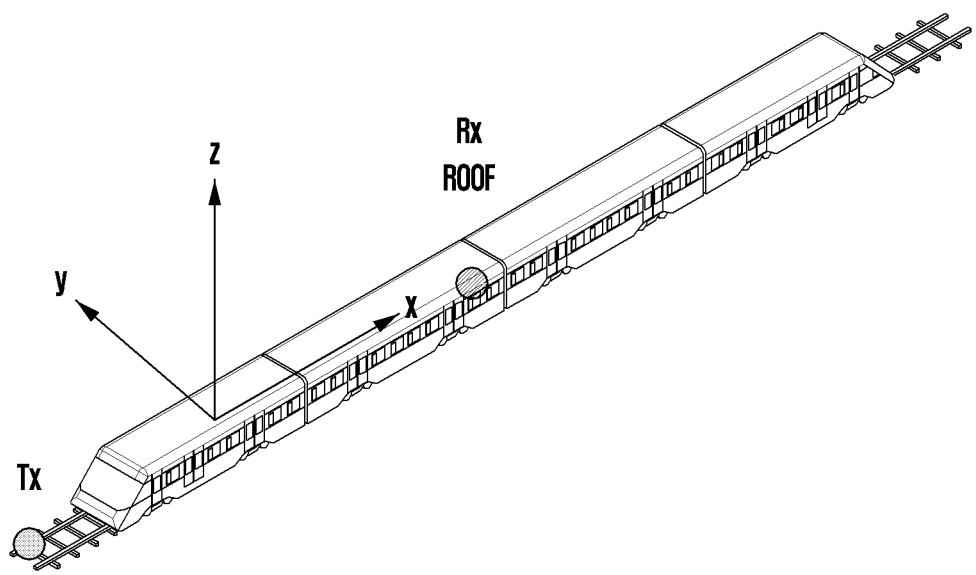
FIG. 1A is a diagram illustrating the incidence angle of radio waves of a receiver when a base station is disposed inside a train tunnel and the receiver is disposed on a roof of a train.
Figure 1A:
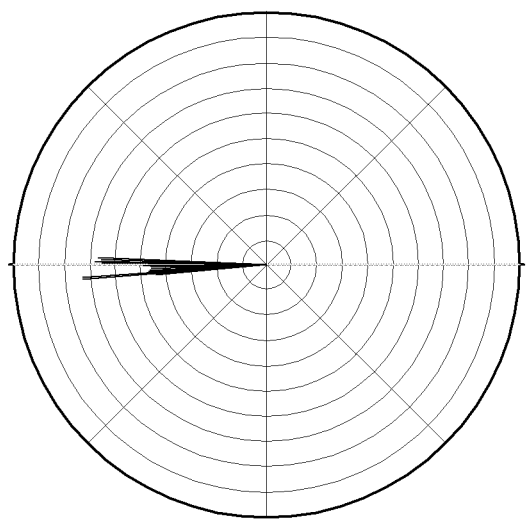
Figure 1A:
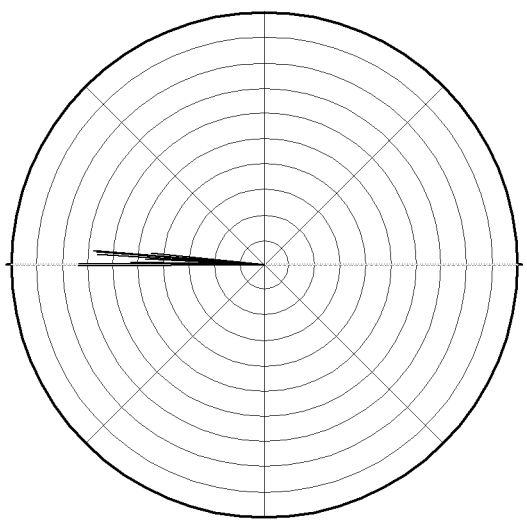

In the following description of embodiments, descriptions of techniques that are well known in the art and not directly related to the present invention are omitted. This is to clearly convey the subject matter of the invention by omitting any unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the disclosure and the manner of achieving them will become apparent with reference to embodiments described in detail below and with reference to the accompanying drawings. The disclosure may, however, be embodied in many different forms and should not be construed as being limited to the embodiments set forth herein. Rather, these embodiments are provided so that the disclosure will be thorough and complete and will fully convey the scope of the disclosure to those skilled in the art. To fully disclose the scope of the disclosure to those skilled in the art, the disclosure is only defined by the scope of claims. In the disclosure, similar reference numbers are used to indicate similar constituent elements.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, refers to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card. Also, in embodiments, the unit may include one or more processors.

The radio wave used for the 5G communication has a strong straightness, so it is important to create a communication environment as close as possible to the line of sight (LOS) environment. Therefore, techniques such as FD-MIMO have been introduced to perform smooth 5G communication as described above, and also the beamforming technique is one of important techniques in the 5G communication.

In general, the beamforming technique is to artificially adjust a beam direction by adjusting the phase of multiple antenna elements. Phase values according to desired directions are previously stored in a storage, and a beam is generated by applying a suitable phase value for the direction of a communicating party to the antenna elements.

Therefore, a base station is capable of generating beams at various angles. The base station determines a beam having the best channel environment with a receiver among the generated beams, thereby communicating with the receiver.

However, in a special situation such as the inside of a tunnel, the above-described beamforming technique may not be effective. For example, in case of a tunnel in which a train runs, the radius of gyration of the tunnel is not large.

Especially, in case of an express train, the radius of gyration of the tunnel is very small. For example, in case of KTX, most rails are configured in a straight line to prevent derailments due to a high speed.

Therefore, a special communication environment may be created between the base station located in the tunnel and the receiver disposed in the train. Now, such communication environments will be described with reference to FIGS. 1A and 1B.

FIG. 1A is a diagram illustrating the incidence angle of radio waves of a receiver when a base station is disposed inside a train tunnel and the receiver is disposed on a roof of a train.

Specifically, FIG. 1A shows the incidence angle of radio waves at the receiver when viewing beams transmitted by the base station on the XY plane, and the incidence angle of radio waves at the receiver when viewing the beams on the XZ plane.

As shown in FIG. 1A, regardless of which plane viewing the base station, most beams radiated from the base station are incident in a front direction (i.e., the X-axis direction) in which the train proceeds.

In addition, even if the transmission angle of the beams radiated through a beam scan operation of the base station is changed, the incidence angle of radio waves at the receiver does not have a large difference.

Figure 1B:
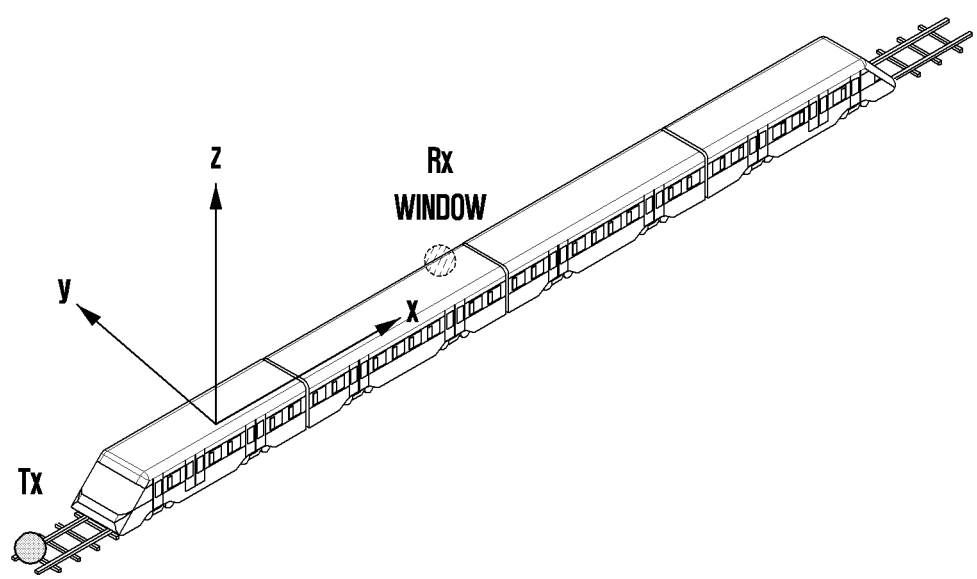
FIG. 1B is a diagram illustrating the incidence angle of radio waves of a receiver when a base station is disposed inside a train tunnel and the receiver is disposed on a window of a train.
Figure 1B:
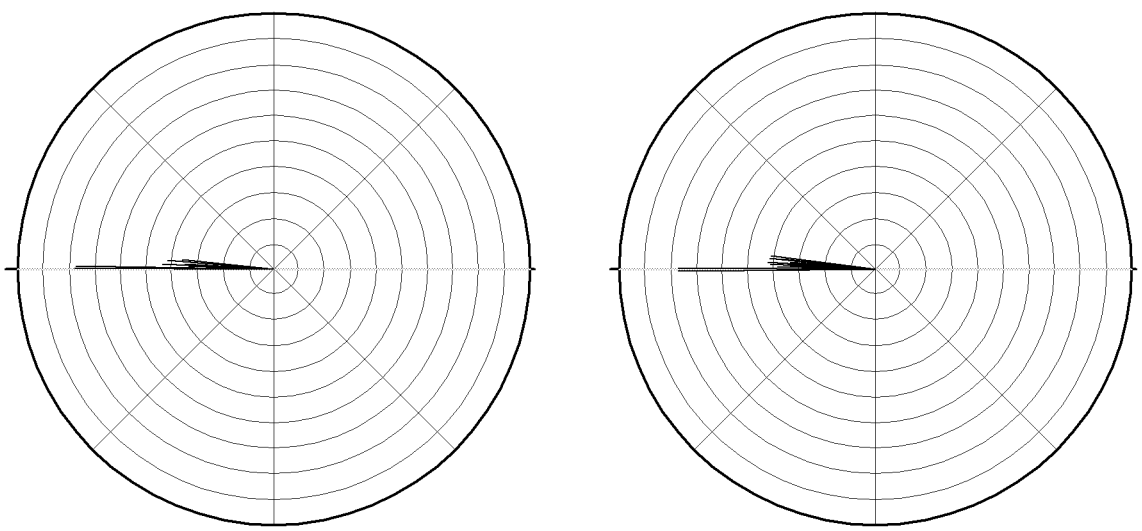

FIG. 1B is a diagram illustrating the incidence angle of radio waves of a receiver when a base station is disposed inside a train tunnel and the receiver is disposed on a window of a train.

The incidence angle of radio waves shown in FIG. 1B is generally similar to the incidence angle of radio waves shown in FIG. 1A.

That is, irrespective of whether the receiver is located on the roof or window of the train, the incidence angle of radio waves received at the receiver will maintain a constant angle. In addition, regardless of the transmission angle at which the base station radiates beams, the incidence angle of radio wave incident on the receiver may have a similar value.

That is, because the receiver always receives radio waves from the base station at a similar angle in a tunnel having small radius of gyration, the base station may not need to perform a beam scan operation to find a beam having better channel environment. In addition, the receiver may not need to analyze information on a beam received from the base station and then send the analyzed information back to the base station.

That is, the base station always transmits the beam at a fixed angle inside the tunnel, and the receiver may receive the beam and thereby communicate with the base station. Therefore, an operation such as a beam scan is not needed in communication between the base station and the train inside the tunnel, so that a communication procedure between the base station and the train may be more simplified than in a related art.

However, because the base station radiates radio waves in only one fixed direction inside the tunnel as described with reference to FIGS. 1A and 1B, it may be required for the receiver to change its structure to receive the radio waves.

Therefore, the disclosure proposes some structures of the receiver in consideration of such a special situation (i.e., a situation where the base station radiates a beam only at a fixed or predetermined radiation angle).

Specifically, a first proposed structure of the receiver is to consider a case where the receiver is disposed on the side window of the train. Also, a second proposed structure of the receiver is to consider a case where the receiver is disposed on the roof of the train. Finally, a third proposed structure of the receiver is to consider a case where the receiver is disposed on the front window of the train.

Although the disclosure addresses some structures of the receiver disposed in the train, the scope of the disclosure should not be limited thereto. The receiver structures of the disclosure may be applied to any communication environment in which the base station can communicate with the receiver even though the base station radiates a beam at a fixed angle without performing a beam scan operation as described above.

For example, the receiver structures according to the disclosure may also be applied to a vehicle entering a tunnel having small radius of gyration.

Figure 2:
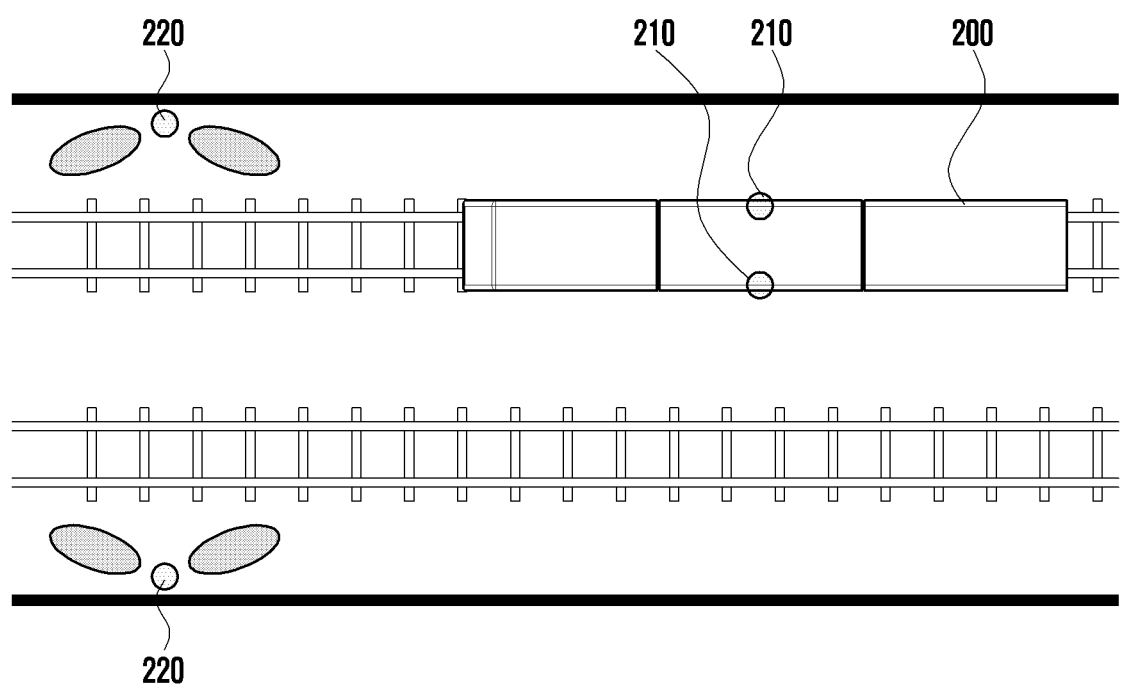
FIG. 2 is a diagram illustrating a case where a base station is disposed inside a train tunnel and a receiver is disposed on a window of a train.

FIG. 2 is a diagram illustrating a case where a base station is disposed inside a train tunnel and a receiver is disposed on a window of a train.

As described above, the base station 220 may be disposed on both sides of the inside of the tunnel. (However, this is exemplary only. Alternatively, the base station may be located at the center of the ceiling of the tunnel, or disposed on only one side of the inside of the tunnel.)

The receiver 210 may be disposed on a window of the side of the train 200. The receiver may be disposed in only one carriage of the train as shown in FIG. 2, and also disposed in two or more carriages of the train.

However, because a frame of the train 200 generally includes metal, it is preferable to dispose the receiver 210 while avoiding the train frame in view of improving the gain value of the receiver 210.

When the receiver 210 is disposed on the side window of the train 200 as shown in FIG. 2, the angle at which the radio waves radiated from the base station reach the window will be close to about 90 degrees as seen in FIGS. 1A and 1B.

In this case, most of the radio waves radiated from the base station may be reflected without transmitting through the window because of the property of glass which is a main material forming the window. In general, the millimeter wave incident on the glass cannot transmit the glass when an incidence angle exceeds 50 degrees. (This is, however, exemplary only to aid understanding of the disclosure, and therefore the scope of the disclosure should not be limited thereto. The incidence angles that allow the radio wave to transmit the glass may be varied depending on the length of the radio wave or the materials constituting the glass.)

Accordingly, in order to solve such a problem, the disclosure provides a solution of disposing a lens on the window of the train, and a detailed description thereof will be made hereinafter with reference to FIG. 3.

Figure 3:
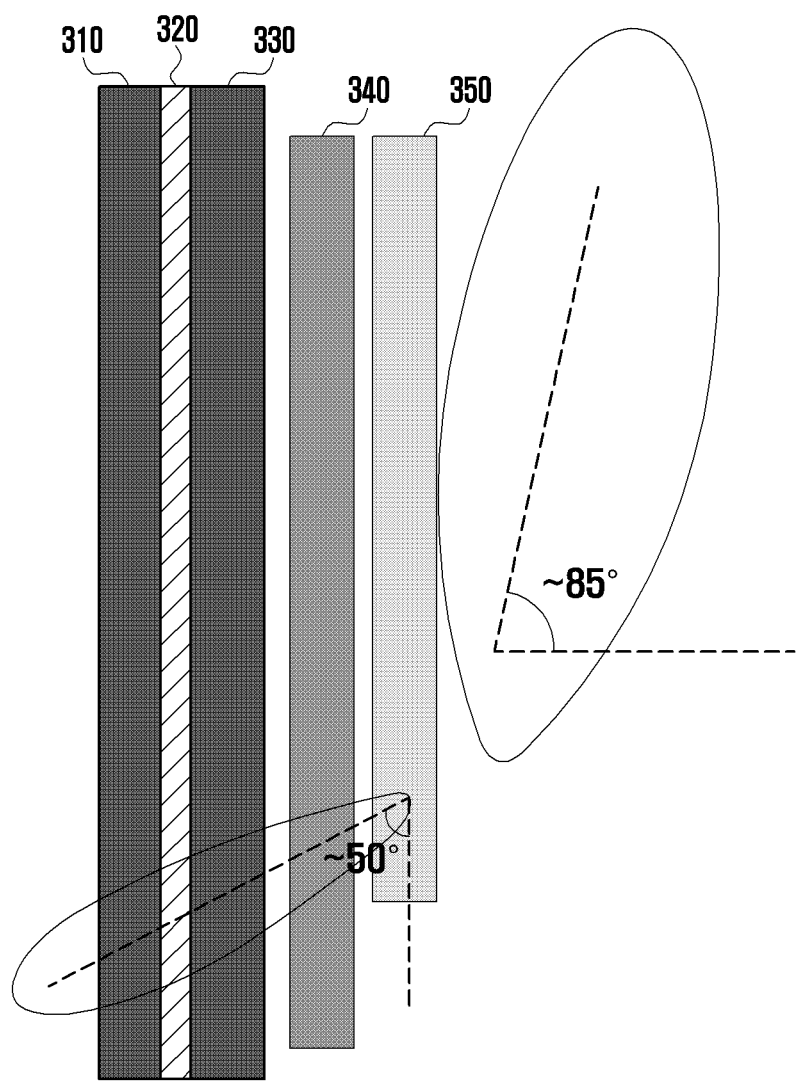
FIG. 3 is a diagram illustrating a structure in which a lens and a dielectric slab are disposed on a side window of a train according to the disclosure.

FIG. 3 is a diagram illustrating a structure in which a lens and a dielectric slab are disposed on a side window of a train according to the disclosure.

Generally, a window formed in a train or vehicle may include two glass layers 310 and 330 and one protective film layer 320 as shown in FIG. 3.

The protective film layer 320 not only adheres the two glass layers 310 and 330 to each other, but also increase the rigidity of the window. In addition, even if the glass layer is broken by impact, the protective film layer 320 can prevent pieces of broken glass from being scattered inside or outside the train. Normally, the protective film layer 320 may be formed of polyvinyl butyral (PVB) or polyvinyl alcohol (PVA).

As described above, the incidence angle of radio waves incident on the outer surface of the window is about 85 degrees. However, as described above, most of radio waves incident at an incidence angle of 85 degrees cannot penetrate the glass due to the physical properties of glass forming the window.

Therefore, the disclosure proposes a lens 350 that is disposed on the outer surface of the window and is capable of changing the incidence angle of the radio wave received from the base station such that the radio wave can transmit the window and then reach the receiver disposed on the inner surface of the window.

Specifically, if the incidence angle of the radio wave exceeds a predetermined reference value, the lens 350 changes the incidence angle of the radio wave by changing the phase value of the radio wave so that the incidence angle of the radio wave incident on the window becomes smaller than the predetermined reference value.

In the above example, if the radio wave radiated by the base station is incident on the lens 350 at an incidence angle of 85 degrees, the lens 350 may change the incidence angle of the incident radio wave to about 50 degrees or less.

The more the incidence angle is reduced through the lens 350, the more the amount of radio waves that transmit the glass may be increased. In contrast, when the incidence angle is reduced, the magnitude of radio waves that are incidentally reflected may be reduced. Thus, it may be desirable to reduce the incidence angle of the radio wave in consideration of a change in the magnitude of the radio wave according to the incidence angle of the radio wave.

The lens 350 has a pattern formed therein to change the phase value of the radio wave incident on the lens 350, and is thereby capable of freely changing the incidence angle of the radio wave. That is, a pattern size or a pattern interval may be adjusted in accordance with a designer's need, so that the incidence angle of the beam incident through the lens 350 can be freely changed. Specifically, according to the disclosure, a plurality of pattern units having different degrees of phase compensation may be formed in the lens 350 to change the incidence angle of radio waves incident on the lens.

Figure 11:
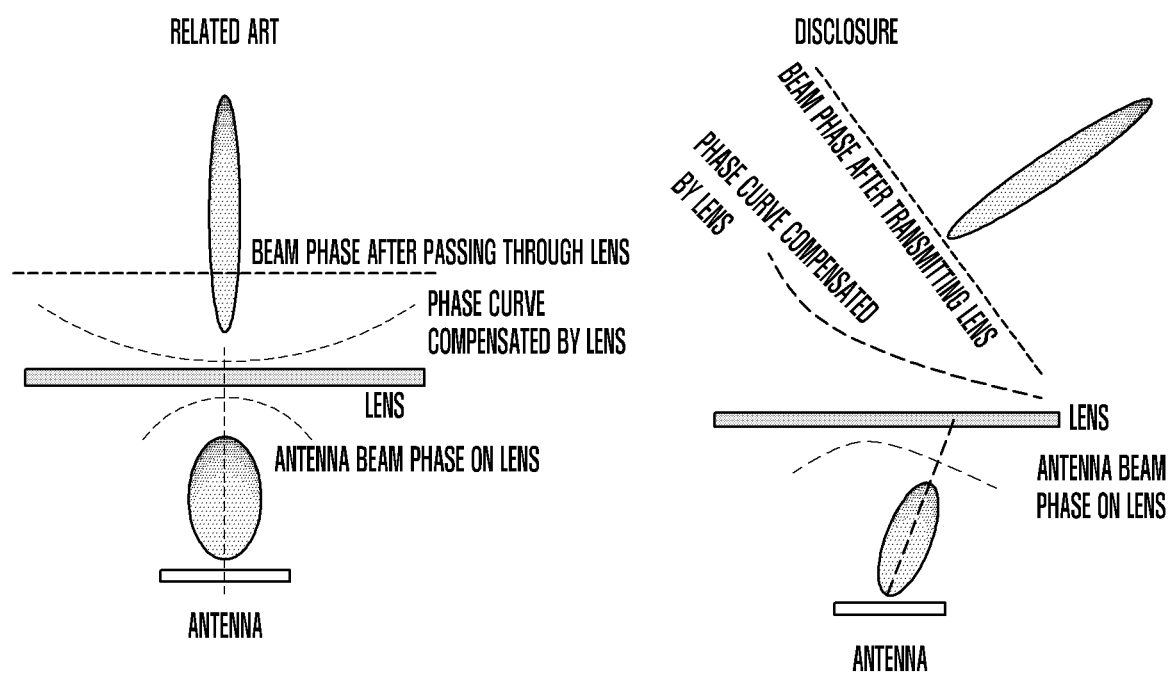
FIG. 11 is a diagram illustrating a comparison of a lens structure according to the disclosure and a lens structure according to a related art.

FIG. 11 shows a comparison between a lens structure according to a related art and a lens structure according to the disclosure.

According to a related art, the lens has a lens phase curve shape of a symmetrical parabolic structure, and the center of the lens coincides with the center of the antenna. Therefore, the angle of the beam after transmitting the lens is maintained at the same angle as the antenna beam angle.

In contrast, the lens according to the disclosure has a lens phase curve shape of an asymmetric parabolic structure, and the center of the lens is different from the center of the antenna. Therefore, the angle of the beam after transmitting the lens is different from the antenna beam angle. Through this, it is possible to change the incidence angle of the beam.

Accordingly, only disposing the lens 350 on the window allows the incidence angle of the radio wave incident on the window to be changed, so that the radio wave can transmit the window and be transmitted to the receiver disposed on the inner side of the window. As a result, a communication network between the base station and the receiver can be formed.

Meanwhile, the disclosure further proposes a dielectric slab 340 disposed between the window and the lens 350 in order to compensate for the loss of the gain value of the radio wave due to the permittivity of the glass layers 310 and 330 and the protective film layer 320 constituting the window.

Specifically, the dielectric slab 340 may serve to compensate for gain loss caused by transmitting a window by changing the permittivity of radio waves incident through a lens. The permittivity of the dielectric slab 340 may be determined based on the permittivity and thickness of each of the glass layer and the protective film layer constituting the window.

Figure 4:
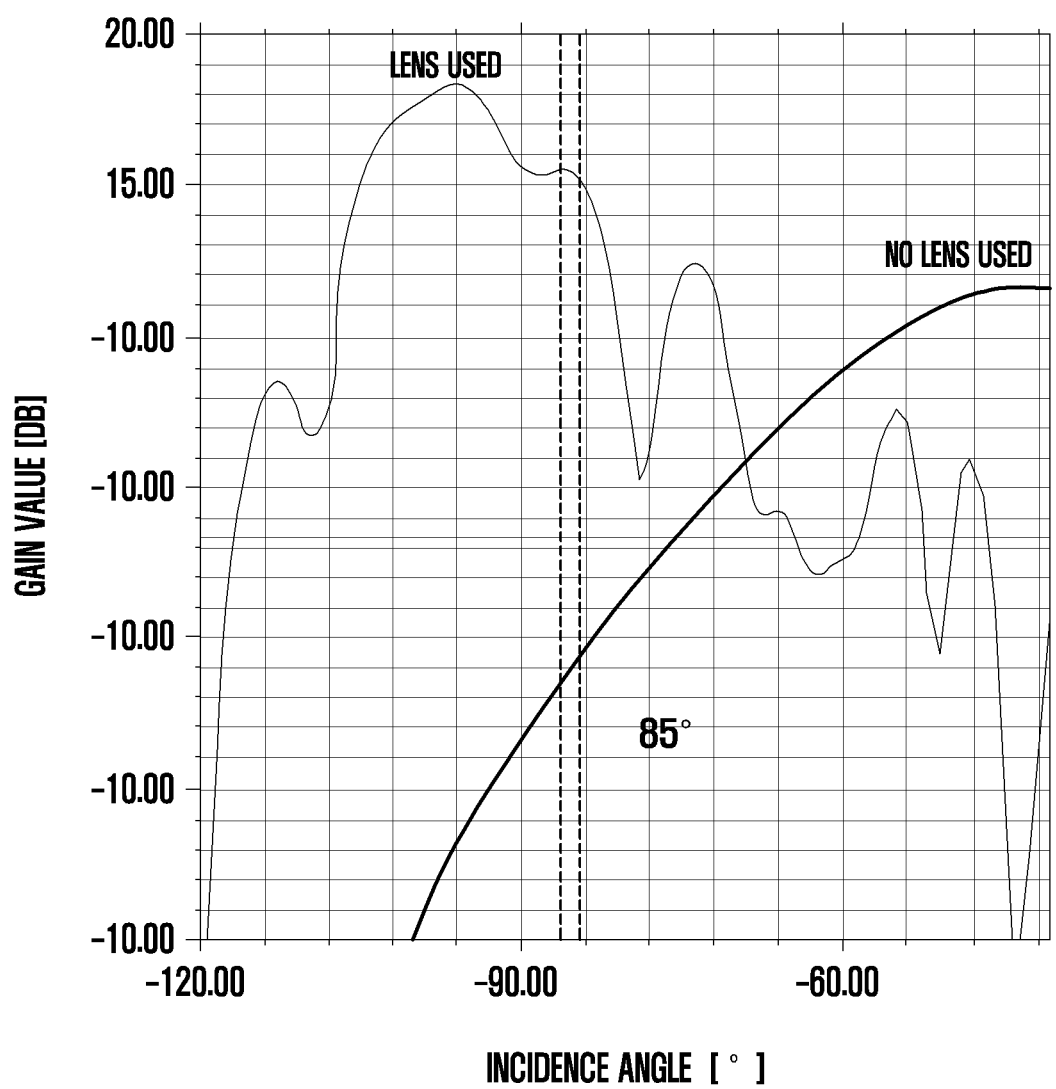
FIG. 4 is a graph comparing a gain value of a receiver when a lens is applied according to the disclosure and when a lens is not applied according to a related art.

FIG. 4 is a graph comparing a gain value of a receiver when a lens is applied according to the disclosure and when a lens is not applied according to a related art.

According to the graph shown in FIG. 4, when the incidence angle on the window is 85 degrees and when the lens is applied to the window, the gain value of about 10 dB or more is improved compared to the case where the lens is not applied.

Figure 5:
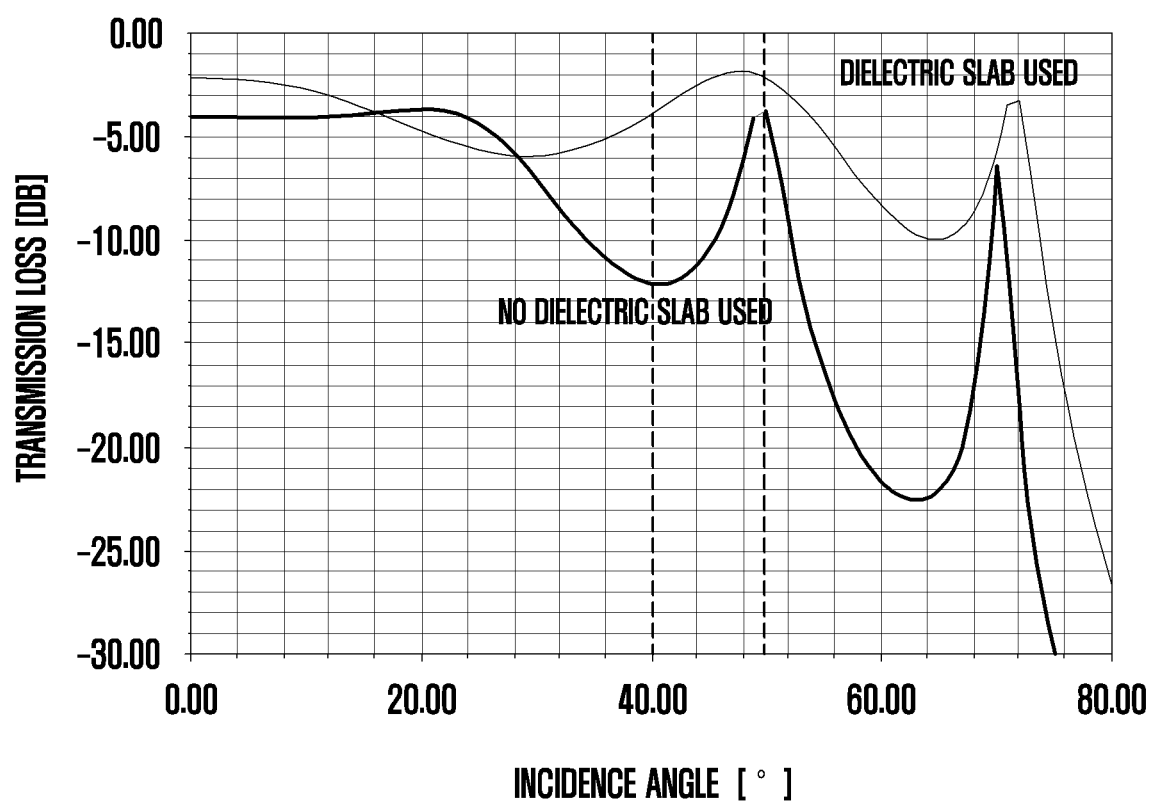
FIG. 5 is a graph comparing gain values of a receiver when a dielectric slab is applied according to the disclosure and when a dielectric slab is not applied according to a related art.

Also, when the incidence angle is between about 40 degrees to about 50 degrees as shown in FIG. 5, compensation for the gain value loss of about 5 dB or more occurs in case of applying the dielectric slab in comparison with other case of applying no dielectric slab. (The reason for confirming the incidence angle between 40 degrees and 50 degrees in FIG. 5 is that the best gain value is expected when the incidence angle of the radio wave incident on the glass ranges from 40 degree to 50 degree as described above.)

Accordingly, when the lens and the dielectric slab are disposed on the window in accordance with the disclosure, the communication with the base station can be performed smoothly even if the receiver is disposed on the side window of the train. In particular, the receiver structure according to the disclosure is equally applicable to the 5G communication system that uses the millimeter wave having a strong straightness.

Specifically, if the receiver can be disposed on the inner surface of the side window of the train in accordance with the disclosure, it may be considered to dispose the receiver on the window of each carriage of the train and also dispose a router connected wiredly or wirelessly to the receiver in each carriage so as to provide a wireless network to passengers.

In addition, it may be considered to dispose the receiver on the window of only one carriage of the train and also dispose a router connected wiredly or wirelessly to the receiver in each carriage. This can provide a wireless network to all passengers in the train while minimizing the number of receivers.

Meanwhile, the communication network may be formed in various ways other than the above, and thus the scope of the disclosure should not be limited to the above-described embodiments. The scope of the disclosure will extend to any modification that can be made suitably by those skilled in the art.

Figure 6:
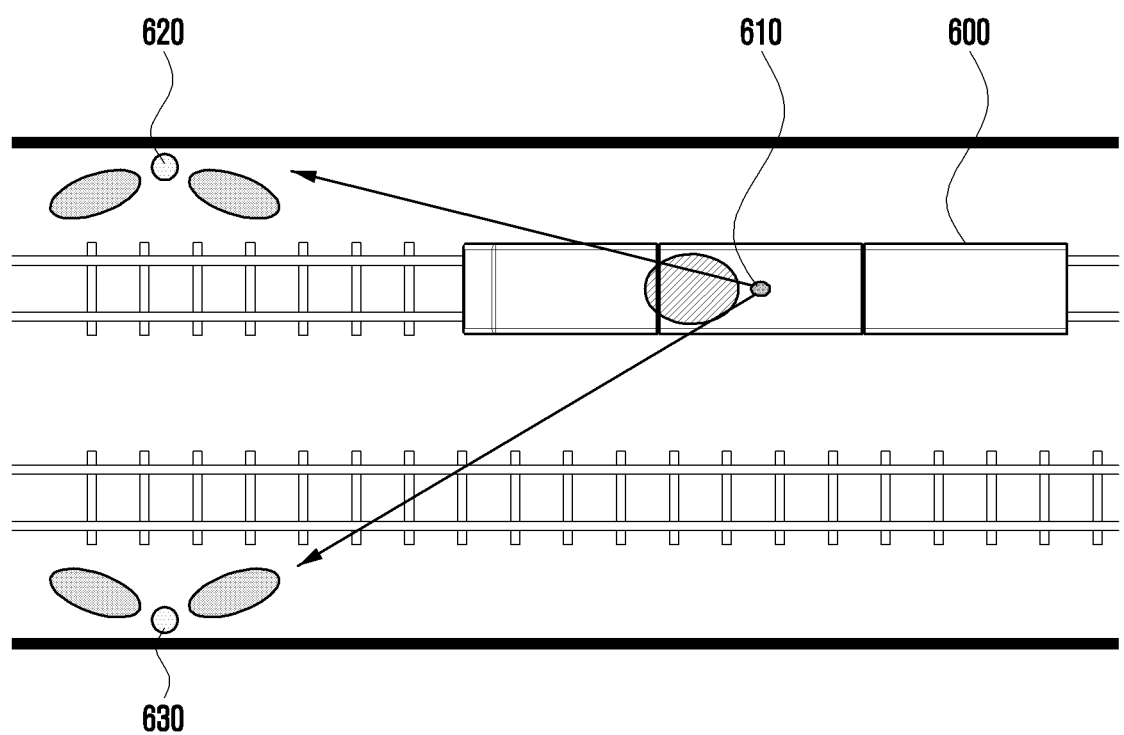
FIG. 6 is a diagram illustrating a structure in which a receiver is disposed on a roof of a train according to the disclosure.

FIG. 6 is a diagram illustrating a structure in which a receiver is disposed on a roof of a train according to the disclosure.

In this structure, the radio wave does not have to through the glass contrary to the above-described structure where the receiver is disposed on the inner surface of the window. In addition, because the incidence angle of the radio wave received by the receiver may be close to zero degree as shown in FIG. 1A, the lens for changing the incidence angle of the radio wave may not be needed.

Meanwhile, as shown in FIG. 6, a base station 620 for an up-line and a base station 630 for a down-line may be disposed together inside the tunnel. In this case, a receiver 610 disposed on a roof of a train 600 may also use a base station disposed for the opposite direction to the traveling direction of the train.

For example, even if the train 600 travels on the up-line, it may receive radio waves from the down-line base station 630 as well as the up-line base station 620. That is, using both radio waves of the up-line base station 620 and the down-line base station 630 can improve the gain value of the receiver 610.

However, because the up-line base station 620 and the down-line base station 630 are disposed at different positions inside the tunnel, the receiver 610 may receive the radio waves at different incidence angles from the up-line and down-line base stations 620 and 630.

Therefore, in order to communicate with both the up-line base station 620 and the down-line base station 630, the receiver 610 disposed on the roof of the train 600 should be able to receive radio waves within an angle (θ) formed between the up-line base station 620 and the down-line base station 630. The structure of the receiver 610 for solving such a problem is shown in FIG. 7.

Figure 7:
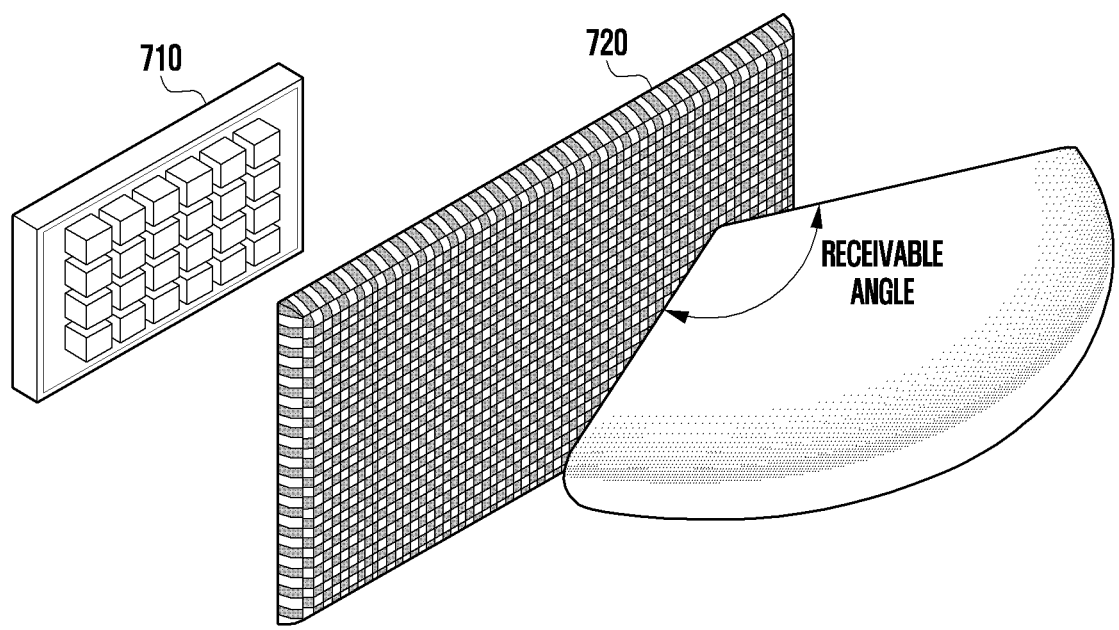
FIG. 7 is a diagram illustrating a structure of a receiver disposed on a roof of a train according to the disclosure.

FIG. 7 is a diagram illustrating a structure of a receiver disposed on a roof of a train according to the disclosure. The receiver may be composed of an antenna array 710 and a lens 720. The antenna array 710 may include a plurality of antenna units, and may receive radio waves radiated from a base station through the plurality of antenna units.

The lens 720 shown in FIG. 7 may have a structure similar to the lens shown in FIG. 3. That is, the incidence angle of the radio wave incident through the lens may be changed through a pattern formed on the lens 720, so that the receivable angle of the radio wave at the antenna array 710 can be widened through the lens 720.

It is desirable that the receivable angle of the receiver widened through the lens 720 has the maximum value corresponding to the above-mentioned value θ. If the receivable angle exceeds the θ value, the gain value of the receiver may decrease.

Figure 8:
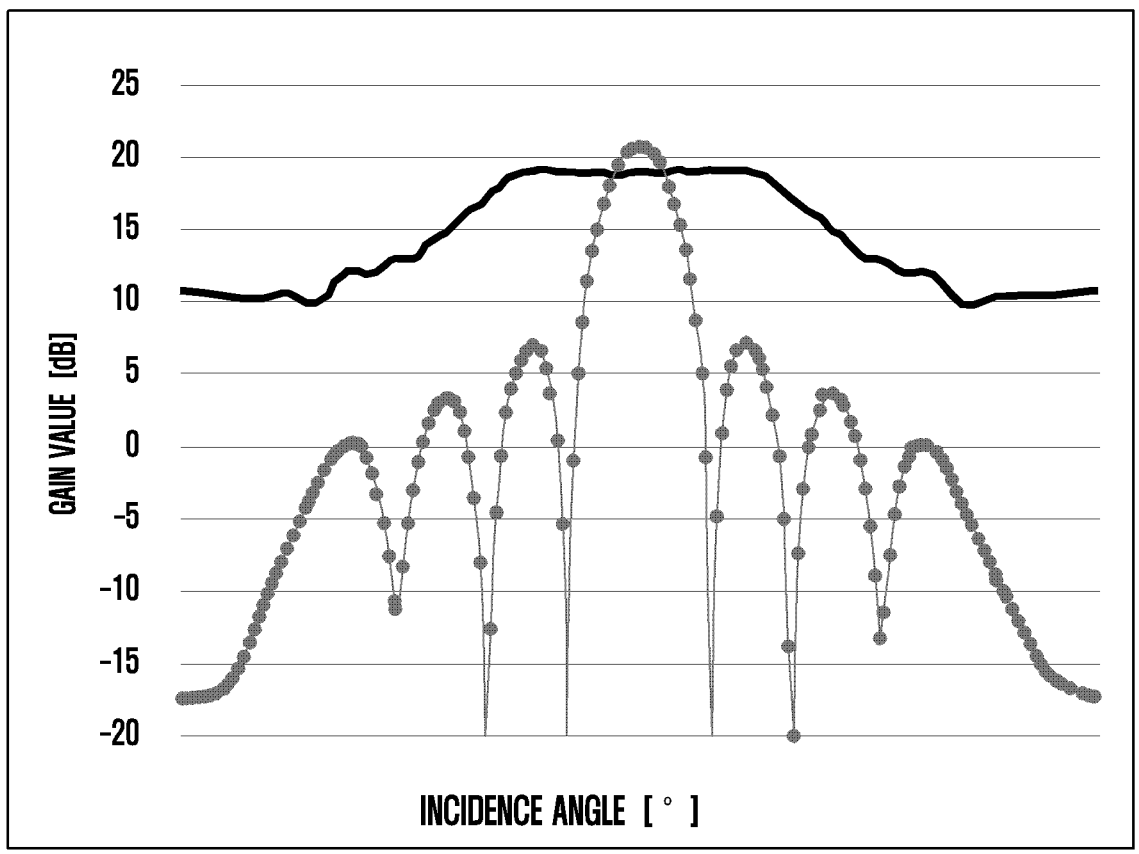
FIG. 8 is a graph comparing gain values of a receiver when a lens is applied to a receiver according to the disclosure and when a lens is not applied according to a related art.

FIG. 8 is a graph comparing gain values of a receiver when a lens is applied to a receiver according to the disclosure and when a lens is not applied according to a related art.

When the lens is not applied according to a related art, it is not possible to receive the radio waves from both the up-line base station and the down-line base station. Thus, the gain value of the receiver is unvaried in comparison with a case of receiving the radio waves from only one base station.

In contrast, according to the disclosure, disposing the lens in the receiver to improve the receivable angle of the receiver allows the receiver to receive the radio waves from both the up-line base station and the down-line base station. As a result, as shown in FIG. 8, the gain value of the receiver can be improved as a whole.

Therefore, if the receiver can be disposed on the roof of the train in accordance with the disclosure, it may be considered to dispose the receiver including the lens on the roof of each carriage of the train and also dispose a router connected wiredly or wirelessly to the receiver in each carriage so as to provide a wireless network to passengers.

In addition, it may be considered to dispose the receiver including the lens on the roof of only one carriage of the train and also dispose a router connected wiredly or wirelessly to the receiver in each carriage. This can provide a wireless network to all passengers in the train while minimizing the number of receivers.

Meanwhile, the communication network may be formed in various ways other than the above, and thus the scope of the disclosure should not be limited to the above-described embodiments. The scope of the disclosure will extend to any modification that can be made suitably by those skilled in the art.

Figure 9A:
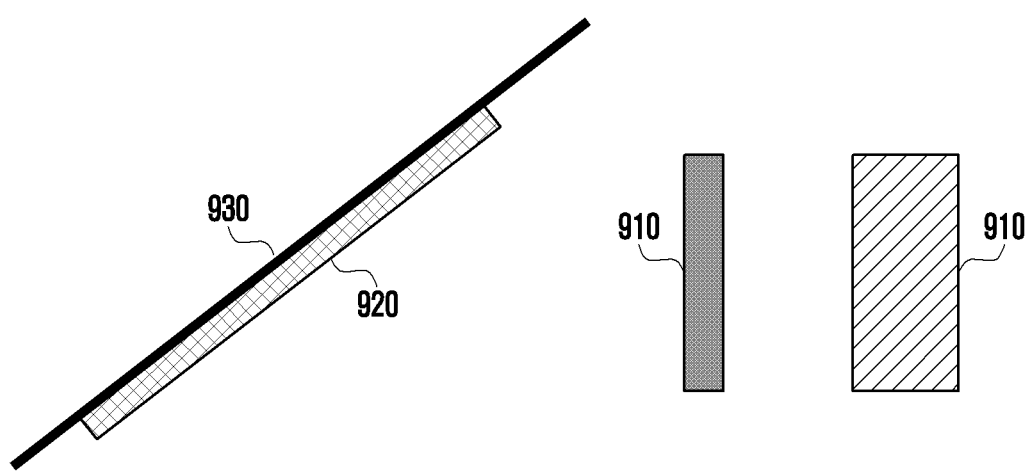
FIGS. 9A and 9B are diagrams illustrating cases where a receiver receives radio waves of a base station through a front window of a train according to the disclosure.
Figure 9B:
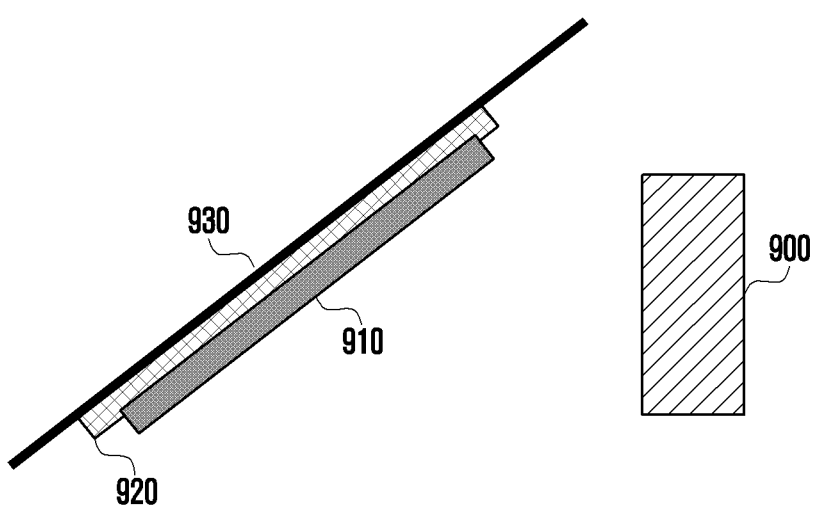

FIGS. 9A and 9B are diagrams illustrating cases where a receiver receives radio waves of a base station through a front window of a train according to the disclosure.

Specifically, FIG. 9A shows a receiver structure in which a lens and a dielectric slab are separated from each other, and FIG. 9B shows a receiver structure in which a lens and a dielectric slab are combined with each other.

The structures shown in FIGS. 9A and 9B are basically similar to the above-described structure in which the receiver is disposed on the side window of the train.

Thus, in the receiver structure shown in FIG. 9A, Radio waves incident through the front window 930 of the train may compensate for the loss of gain value due to glass penetration as it transmits the dielectric slab 920, and then the radio waves transmitting the dielectric slab 920 will be transmitted to a receiver 900 through a lens 910 located in front of the receiver 900. Therefore, in the structure as shown in FIG. 9A, the gain value of about 10 dB or more may be improved as in the above-described structure.

On the other hand, in the receiver structure shown in FIG. 9B, a combination of the lens 910 and the dielectric slab 920 is combined with the front window 930 of the train. In this structure, the lens 910 and the dielectric slab 920 may be separately formed as shown in FIG. 9B, and alternatively the dielectric slab 920 may also perform the function of the lens 910 by means of a metal pattern added to the dielectric slab 920.

If the receiver can be disposed on the front window of the train in accordance with the above structures, it may be considered to dispose a router connected wiredly or wirelessly to the receiver in each carriage of the train so as to provide a wireless network to all passengers in the train.

Meanwhile, the communication network may be formed in various ways other than the above, and thus the scope of the disclosure should not be limited to the above-described embodiments. The scope of the disclosure will extend to any modification that can be made suitably by those skilled in the art.

Figure 10A:
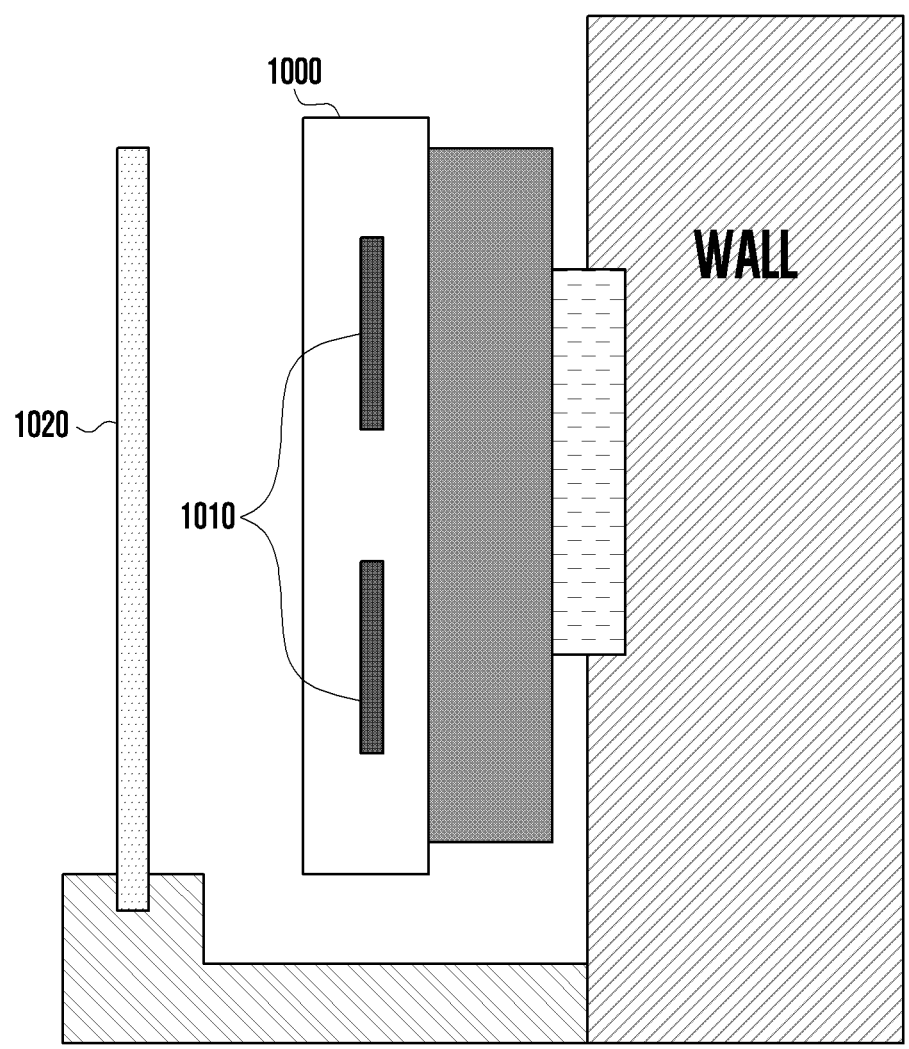
FIGS. 10A, 10B, and 10C are diagrams illustrating cases where a lens is disposed in a base station according to the disclosure.
Figure 10B:
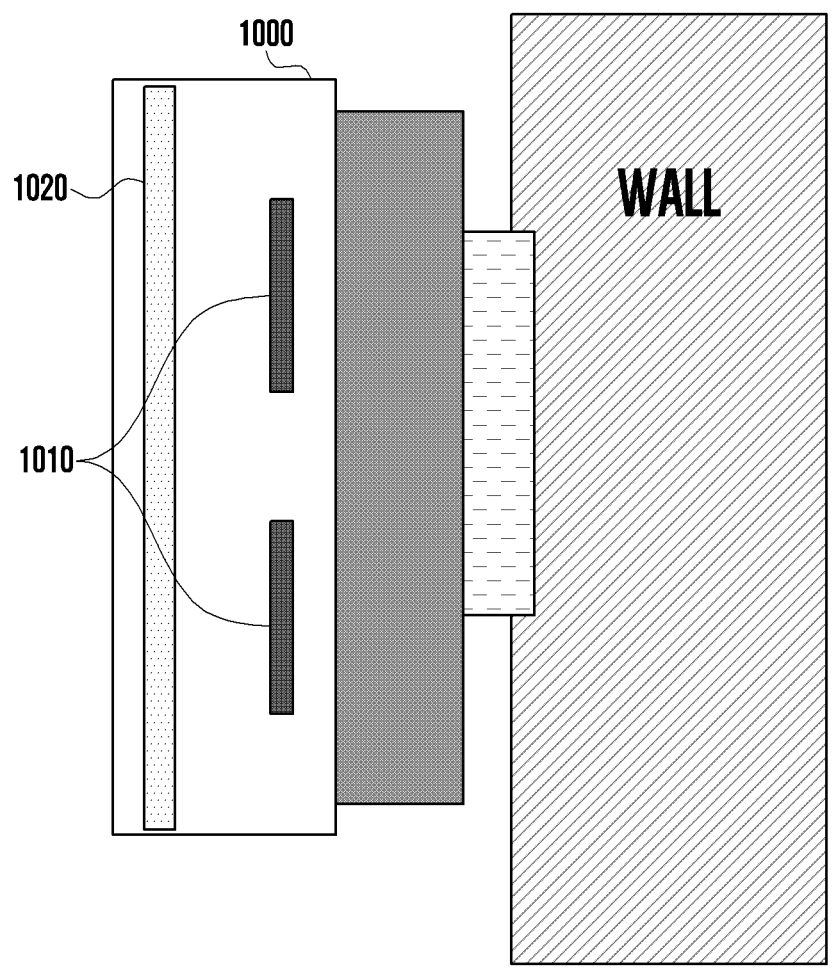
Figure 10C:
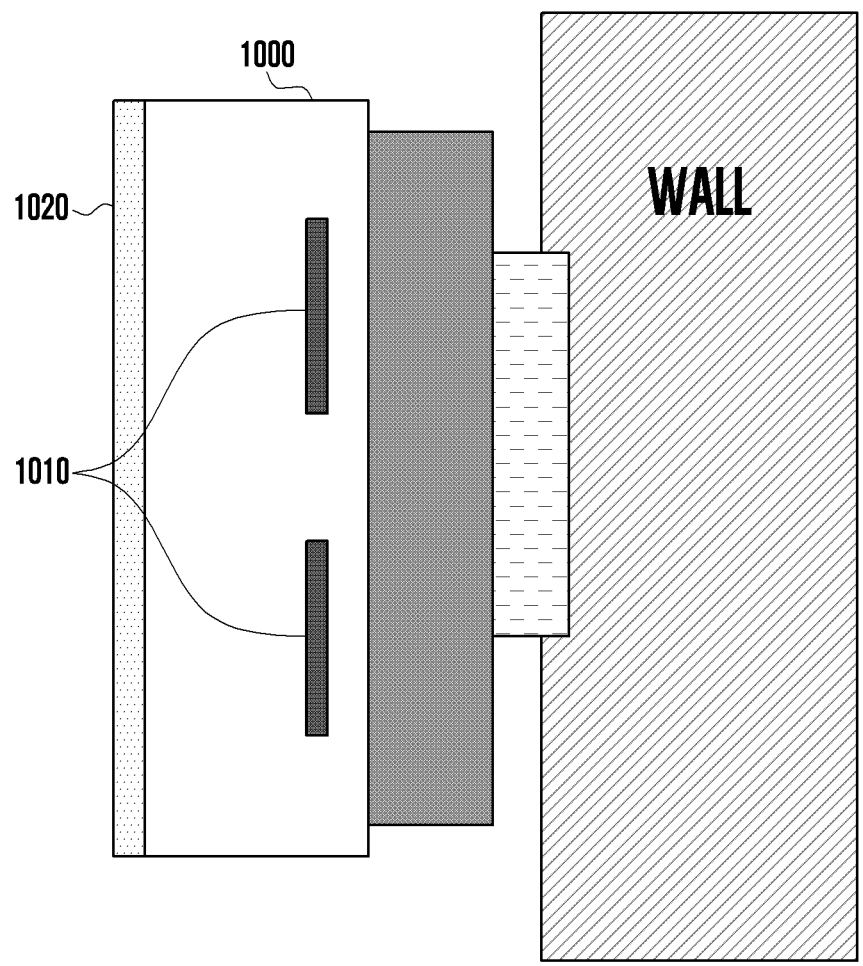

FIGS. 10A, 10B, and 10C are diagrams illustrating cases where a lens is disposed in a base station according to the disclosure.

According to the disclosure, it is possible to dispose the lens in the base station as well as in a receiver. Specifically, FIG. 10A shows a case where the lens 1020 is disposed, in a beam radiation direction, outside the base station 1000 embedding an antenna 1010 therein.

FIG. 10B shows a case where the lens 1020 is disposed inside the base station 1000 to face the beam radiated from the antenna 1010. In addition, FIG. 10C shows a case where the lens 1020 is disposed on one side of the base station 1000 to face the beam radiated from the antenna 1010.

As described above, the lens 1020 may freely adjust the radiation angle and gain value of the radio waves radiated through the lens 1020, depending on a pattern formed in the lens 1020. Thus, suitably utilizing the lens 1020 may improve only the gain value while maintaining the radiation angle of the beam radiated from the antenna 1010.

Therefore, according to the disclosure, it is possible to extend the coverage of the base station by disposing the lens in the base station. This can reduce the number of installed base stations, which is advantageous in terms of maintenance and installation costs of the base station.

Meanwhile, according to a certain embodiment of the disclosure, a plurality of base stations may be disposed inside the tunnel. For example, a first base station, a second base station, and a third base station may be arranged from the entrance of the tunnel to the exit of the tunnel.

That is, a receiver disposed in a train entering the tunnel may initially communicate with the first base station and then sequentially communicate with the second base station and the third base station.

In this case, when the receiver initially communicates with the first base station, the first base station may transmit, to the second base station, preparation request information indicating that the second base station will communicate with the receiver of the train soon. The preparation request information may contain channel information between the first base station and the receiver of the train.

Thereafter, when the receiver communicates with the second base station, the second base station may also transmit similar preparation request information containing channel information between the second base station and the receiver. Thus, the second and third base stations can prepare communication before performing communication with the receiver.

Meanwhile, the base station according to the disclosure can radiate radio waves toward both the entrance and the exit of the tunnel as shown in FIGS. 2 and 6. That is, when the receiver exists between the first and second base stations as the train moves, the receiver of the train may receive the radio waves from each of the first and second base stations.

The gain value of the receiver is greater in this case than in other case where the receiver receives the radio waves from only one base station. It is therefore possible to construct an advantageous communication environment.

While the disclosure has been described in detail with reference to specific embodiments, it is to be understood that various changes and modifications may be made without departing from the scope of the disclosure. Therefore, the scope of the disclosure should not be limited by embodiments described herein, but should be determined by the scope of the appended claims and equivalents thereof. In addition, each of the above embodiments can be combined with each other if necessary. For example, such embodiments of the disclosure may be combined at least in part for operations of the base station and the receiver. Although the above embodiments are described based on the LTE system, such embodiments and any modification thereof may also be implemented in other systems such as 5G or NR systems.

The invention claimed is:

1. A glass structure comprising:
   a glass formed to transmit a radio wave; and
   a lens disposed on one side of the glass and changing an incidence angle of the radio wave incident on the one side of the glass,
   wherein the lens has a lens phase curve shape of an asymmetric parabolic structure and a center of the lens is different from a center of an antenna.

2. The glass structure of claim 1, further comprising:
   a dielectric slab disposed between the glass and the lens and compensating for a transmission loss caused when the radio wave incident through the lens transmits through the glass.

3. The glass structure of claim 2, wherein a permittivity of the dielectric slab is determined based on a permittivity of the glass and thickness of the glass.

4. The glass structure of claim 1, wherein when the incidence angle of the radio wave incident on the lens exceeds a predetermined reference value, the lens changes a phase value of the radio wave so that the incidence angle of the radio wave incident on the glass becomes smaller than the predetermined reference value.

5. A train receiving a radio wave radiated from a base station at a predetermined radiation angle, the train comprising:
   a lens disposed on an outer surface of a window of the train and changing an incidence angle of the radio wave incident from the base station.

6. The train of claim 5, further comprising:
   a dielectric slab disposed between the window and the lens and compensating for a transmission loss caused when the radio wave incident through the lens transmits through the window.

7. The train of claim 6,
   wherein the window has a structure in which a first layer formed of glass, a second layer formed of a protective film, and a third layer formed of glass are stacked in a direction from an inside of the train to an outside of the train, and
   wherein a permittivity of the dielectric slab is determined based on a permittivity of each of the glass and the protective film.

8. The train of claim 5, wherein the lens changes a phase value of the radio wave radiated from the base station and thereby reduces an incidence angle of the radio wave incident on the window.

9. The train of claim 5, further comprising:
a receiver disposed on an inner surface of the window of the train and receiving the radio wave from the base station,
wherein the lens reduces an incidence angle of the radio wave incident on the window to transmit the radio wave to the receiver.

10. A train comprising:
a receiver receiving a radio wave radiated from at least one base station at a predetermined radiation angle,
wherein the receiver includes an antenna array capable of transmitting and receiving the radio wave, and a lens disposed to be spaced apart from the antenna array at a predetermined interval, and
wherein the lens changes an incidence angle of the radio wave incident from the at least one base station.

11. The train of claim 10, wherein the receiver is disposed on a roof of the train, and the lens changes an incidence angle of the radio wave radiated from the at least one base station to transmit the radio wave from a plurality of base stations to the antenna array.

12. The train of claim 10, wherein the receiver is disposed on a front window of the train, and the lens changes an incidence angle of the radio wave radiated from the at least one base station to transmit the radio wave from a plurality of base stations to the antenna array.

* * * * *